Aug. 7, 1951     H. MOORE     2,563,262
WASTE DISPOSAL SYSTEM
Filed June 19, 1948
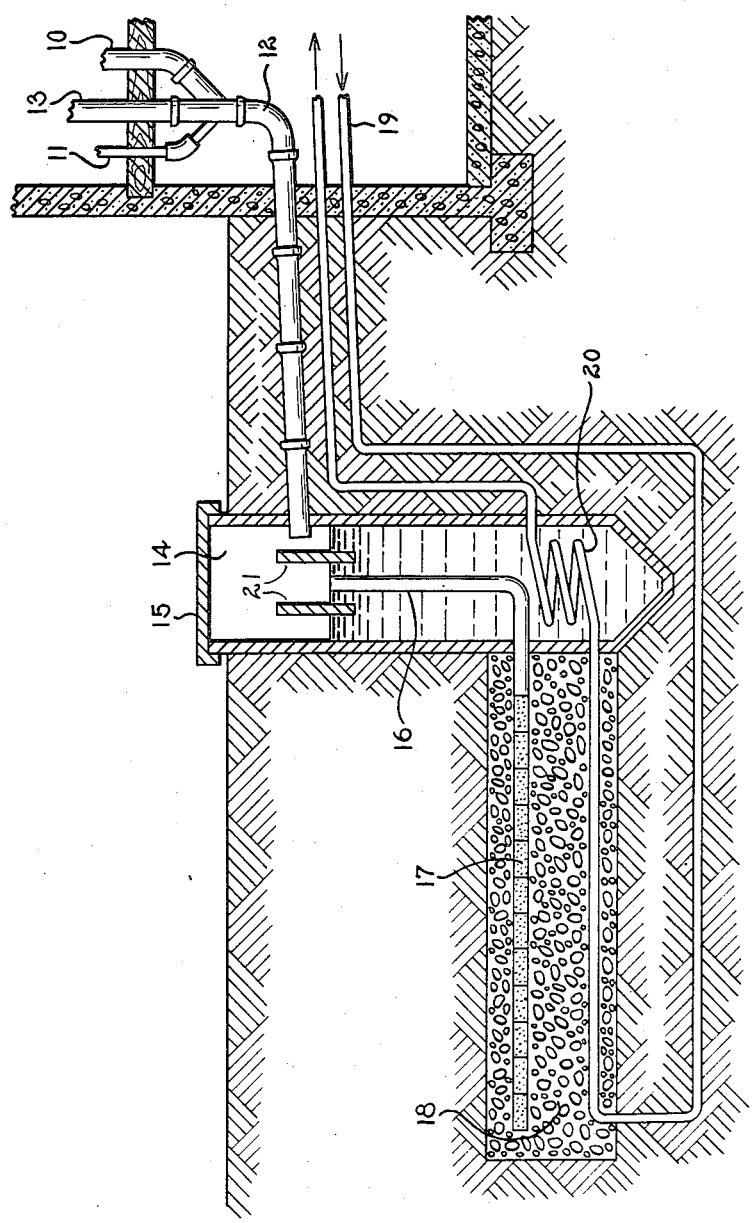
Inventor
Herbert Moore
By Arthur Sinson
Attorney Patented Aug. 7, 1951

2,563,262

UNITED STATES PATENT OFFICE 2,563,262

WASTE-DISPOSAL SYSTEM

Herbert Moore, Milwaukee, Wis., assignor to Modern Disposal Systems Inc., Milwaukee, Wis., a corporation of Wisconsin Application June 19, 1948, Serial No. 34,126

5 Claims. (Cl. 126—344)

The invention relates to improvements in liquid waste disposal systems, and particularly to the recovery of heat energy from the waste and the utilization of such heat energy.

An object of the invention is to extract inherent heat energy from the waste which is discharged from dwellings and the like.

Another object is to employ the waste for increasing the heat conductivity of the ground circumjacent the system.

Another object is to recover heat energy from the circumjacent ground.

Another object is to employ the heat inherent in the waste for heating a dwelling.

Another object is to utilize waste for increasing the heat conductivity of the ground in the vicinity of a dwelling for the more efficient use of the heat of the earth for heating processes.

Another object is to recover heat due to biological changes in the waste.

Another object is to employ such recovered heat for controlling the biological stabilization of the waste.

Another object is to amplify the heat extractable from the soil by the heat extracted from waste discharged into the soil and by heat generated by biological and chemical processes in the waste.

Another object is the recovery of useful components of the products resulting from the stabilization and sterilization of the waste.

Other objects and advantages will hereinafter appear.

The accompanying drawing is illustrative of an embodiment of the invention as applied to a residence.

In the drawing, sewer pipes 10 and 11 collect the waste liquid from toilets, sinks etc. of a residence (not shown) and deliver it to a soil pipe 12. Connected to the soil pipe 12 may be a conventional ventilating stack 13. The soil pipe in turn conveys the waste into a sump or chamber 14, which is preferably sunk into the ground and provided with a removable cover 15. Arranged in the sump or chamber is an overflow pipe 16, into which the supernatant liquid of the sewage flows and which conducts it to one or more horizontal porous drainage tiles or pipes 17. The sump 14 has baffles 21 therein extending from above the discharge end of and at substantially right angles to the soil pipe 12 to below the level of the waste in the sump. One baffle is closely adjacent the end of the soil pipe for discharge thereagainst of the waste, and the several baffles coact in dividing the waste surface to provide relatively quiescent portions, two of the baffles defining a quiescent surface about the upper end of the overflow pipe 16. The drainage tiles are preferably buried in a bed 18 of gravel or the like, preferably arranged some distance below the surface of the ground at a depth at which the temperature of the ground throughout the seasons is more or less constant and in any event above freezing temperature. The liquid discharged into the gravel bed percolates therethrough into the surrounding ground to be ultimately absorbed by the latter, whereby the heat conductivity of the ground is usually increased.

Leading from the residence is a pipe 19, filled with a heat exchange fluid. The pipe 19 is preferably carried down into the ground to a level below that of the gravel bed 18. It then passes successively through the bed and through a coil 20 mounted in the lower part of the sump or chamber 14, so as to afford a large heat exchange surface in the sump. The pipe 19 then returns to the residence.

The pipe 19 may be connected inside of the residence to a heat exchanger (not shown) of any suitable type, which brings the liquid therein into heat exchanging contact with a heating medium for heating the residence.

The waste discharged into the sump has a temperature which is usually above the ambient air temperature, as it contains warm waste water and other waste of more or less elevated temperature. In addition, the chemical and biological processes in the sump generate heat, some or all of which may be absorbed by the coil 20 to be returned by the liquid therein to the heat exchanger in the residence where it may be employed to supplement other heating means.

The supernatant liquid which is discharged into the gravel bed is there subjected to further aerobic organisms action which sterilizes it and which produces additional heat to be absorbed by the pipe 19 in its passage through the gravel.

The liquid discharged into the gravel bed is thus sterilized and percolates into the surrounding ground to more or less saturate the latter, thereby increasing the heat conductivity of the ground, which in turn accelerates heat flow from the ground to the gravel bed. This heat flow accelerates the aerobic action in the bed and the resulting heat generated thereby, which heat is in turn absorbed through the pipe 19.

The heat energy absorbed by the pipe 19 may be used in various ways; for instance, it may be used in an air heating system for preliminary heating of the outside air drawn into the heating system or for heating the return air prior to its entry into the main heating means of the system.

It is also possible to use the system for summer cooling. Obviously in summer the temperature of the ground surrounding the gravel bed may be considerably below the air temperature. In that case the liquid in the pipe 19 after it has passed through the gravel bed and ground, may be conducted through an air cooler in the residence where it will cause a depression of the ambient air temperature. Thus the heat absorbing capacity of the ground is employed to supplement other cooling means. Such a system has special advantages where atmospheric temperatures vary greatly within short periods, for instance, at high altitudes where the daily temperature variations in summer may be extremely great.

Other modifications of the invention will be apparent to those skilled in the art.

What I claim as new and desire to secure by Letters Patent is:

1. In a structure for utilizing heat energy in liquid waste from a building, a sump, a pipe for draining the waste from the building to the sump, a pipe for draining supernatant liquid from adjacent the surface thereof in the sump and having porous portions, a bed of gravel in the ground for receiving the porous pipe portions and for receiving liquid passing therethrough, and a pipe filled with a heat exchange fluid and adapted to extend from and return to the building and extending through the sump and the bed for extracting heat from the waste in the sump and the bed.

2. In a structure for utilizing heat energy in liquid waste from a building, a sump, baffles in and extending in and across the sump for dividing the cross section thereof into a plurality of areas, the baffles extending below the surface of the liquid in the sump, a pipe for discharging the waste from the building into the sump and into one of the areas defined by the sump baffles, a pipe for draining liquid from the sump adjacent the surface of the liquid therein and in an area thereof defined by the sump baffles and other than the area receiving the waste discharge, the last said pipe having porous portions, a bed of gravel in the ground for receiving the porous pipe portions and for receiving liquid passing therethrough, and a pipe filled with a heat exchange fluid and adapted to extend from and return to the building and extending through the sump and the bed for extracting heat from the waste in the sump and the bed.

3. In a structure for utilizing heat energy in liquid waste from a building, a sump in the ground exteriorly of the building, a pipe for draining the waste from the building to the sump, a pipe for draining liquid from adjacent the surface thereof in the sump and having porous portions, a bed of gravel in the ground exteriorly of the building for receiving the porous pipe portions and for receiving liquid passing therethrough, and a pipe filled with a heat exchange liquid adapted to extend from the building through the sump and the bed, the last said pipe being coiled in the sump adjacent the bottom thereof and adapted to return to the building through the ground for heat exchange between the waste liquid in the bed and the ground adjacent the bed and between the heat exchange liquid and the atmosphere of the building, one length of the last said pipe passing through the ground where the temperature thereof is substantially constant.

4. In a structure for utilizing the heat energy in the fluent waste from a building, a chamber for receiving the waste, a pipe for conveying the waste from the building to the chamber, a bed of granular material in the ground, a pipe for draining liquid waste from the chamber and distributing the liquid waste throughout the bed, and a pipe for retaining a fluid and adapted to extend from the building through the chamber and the bed and back to the building for exchanging heat between the liquid waste, the fluid and the atmosphere of the building.

5. In a structure for utilizing the heat energy in the fluent waste from a building, a chamber for receiving the waste, a pipe for conveying the waste from the building to the chamber, a bed of granular material in the ground below the frost level thereof, a pipe for draining fluent waste from the chamber and distributing the waste throughout the bed, and a pipe for containing a fluid and adapted to extend through the chamber and the bed and the ground beneath the bed and back to the building for exchanging heat between the waste and the ground and the fluid and between the fluid and the atmosphere of the building.

HERBERT MOORE.

REFERENCES CITED

The following references are of record in the file of this patent:

UNITED STATES PATENTS

| Number | Name | Date |
|--------|------|------|
| 213,138 | Shepard | Mar. 11, 1879 |
| 1,038,375 | Jacobson et al. | Sept. 10, 1912 |
| 1,789,377 | Boltz | Jan. 20, 1931 |
| 1,830,099 | Dollinger | Nov. 3, 1931 |
| 2,428,876 | Hawkins | Oct. 14, 1947 |